Aug. 1, 1961    H. G. BRAKEBILL    2,994,505
PILOT OPERATED VALVE MEMBER
Filed July 17, 1958
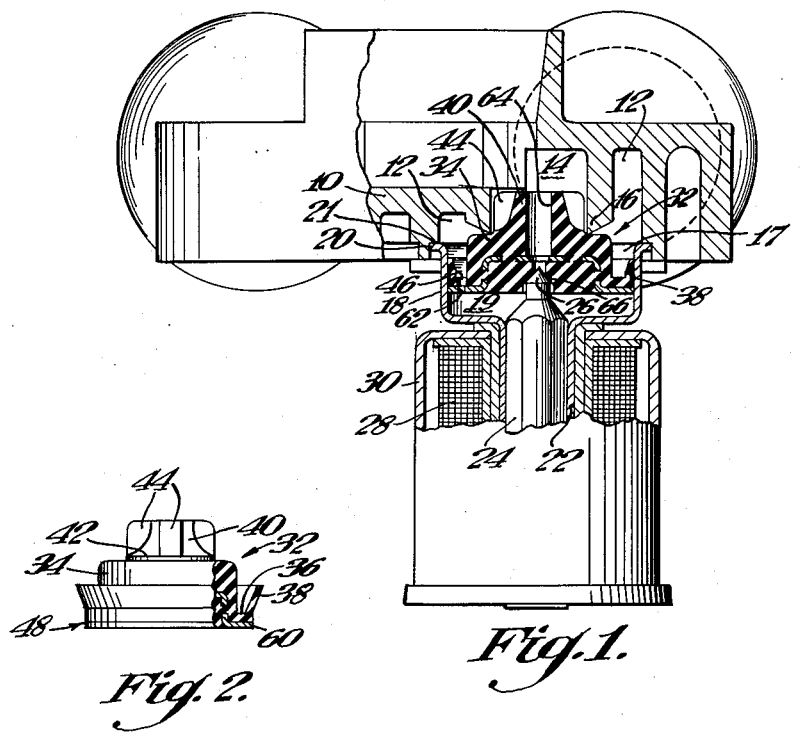
Fig. 1.
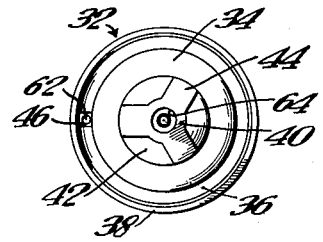
Fig. 2.
Fig. 3.
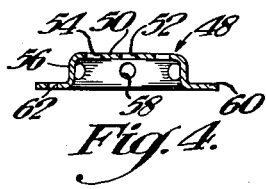
Fig. 4.

United States Patent Office 2,994,505
Patented Aug. 1, 1961

2,994,505
PILOT OPERATED VALVE MEMBER
Harold G. Brakebill, Knoxville, Tenn., assignor to Robertshaw-Fulton Controls Company, Richmond, Va., a corporation of Delaware
Filed July 17, 1958, Ser. No. 749,150
3 Claims. (Cl. 251—358)

This invention relates to valves and more particularly to valve members of the pilot operated type wherein fluid pressure is utilized to assist in the opening and closing operation.

Valves of the pilot operated type have often been provided with diaphragm valve members which are normally formed with semi-rigid body portions surrounded by flexible diaphragms secured to valve casings. Such valve members have a limited life due to the constant flexing of the diaphragm portions in use. Furthermore, the sizes of the bleed holes formed in the flexible portions change due to pressure variations and flexing and the characteristics of the valve members are thereby altered. The flexing also tends to separate the flexible material, usually rubber, from stiffening elements provided in the semi-rigid body portions.

Accordingly, it is an object of this invention to minimize flexure of a valve member and thereby increase the life thereof.

Another object is to increase the bond between the valve member body material and a stiffening member to prevent separation therebetween.

A further object is to increase the lateral stability of the valve member and prevent cocking thereof.

Another object is to prevent the operational characteristics from changing due to changes in the size of a bleed passage.

In a preferred embodiment of this invention, a flow of fluid through a valve housing is controlled by a movable valve member which comprises a resilient body having a stiffening element partially enclosed therein and having a pilot passage and a bleed passage formed therethrough. The valve member is disposed within a chamber and is guided for reciprocal movement by guide means formed on a portion of the valve body and by a portion of the stiffening element. A solenoid actuated armature cooperates with the pilot passage to control the movement of the valve member caused by pressure differentials acting upon the valve member.

Other objects and advantages will become apparent from the following description taken in connection with the accompanying drawings wherein:

FIG. 1 is a partial sectional view of a valve embodying the invention;

FIG. 2 is a partial sectional view of a detail shown in FIG. 1;

FIG. 3 is an end view of a detail shown in FIG. 1; and

FIG. 4 is a cross-section of another detail shown in FIG. 1.

Referring more particularly to the drawing, a housing 10 is formed with an annular inlet 12 concentric to an outlet 14. An annular valve seat 16 is provided between inlet 12 and outlet 14 through which fluid may flow into outlet 14. A cap 18 is mounted on housing 10 by a washer or other suitable connecting means which holds a flange 20 against a recessed shoulder 21. Cap 18 is provided with a sealed tubular extension 22 into which an armature 24, having a conical pointed pilot valve member 26 thereon, is movably disposed. A conventional solenoid 30, having coils 28, is mounted circumjacent tube 22 and causes armature 24 to move in response to the energization of coils 28.

A valve member 32 is movably disposed in the space between cap 18 and housing 10 and divides this area into a chamber 17, which is in direct communication with inlet 12 and which may be in direct communication with outlet 14, and chamber 19, formed on the side of valve member 32 opposite chamber 17. Valve member 32 is formed with a main cylindrical body portion 34, composed of a resilient material such as rubber, which has a flange 36 formed at one end thereof. As best shown in FIG. 2, a flexible, slightly-flared skirt or collar 38 is formed at the outer end of flange 36 and engages the inner wall of cap 18 in a manner hereinafter described.

A hub 40 is formed at the other end of body 34 and has a cylindrical section 42 formed at the base thereof immediately adjacent body 34 which has a diameter slightly less than that of outlet 14. When valve member 32 moves into engagement with valve seat 16, the close fit between section 42 and outlet 14 provides a soft closing feature which prevents water hammer. A plurality, in this instance three, of radially extending guide members 44 are connected at their inner ends to hub 40 and extend outwardly. Members 44 have the same radial dimension as cylindrical section 42 and engage the inner walls of outlet 14 and guide valve member 32 for movement therein. The length of hub 40 and guide members 44 is sufficient to prevent the hub from moving completely out of outlet 14 when valve member 32 opens.

Stiffening means comprising stiffener 48, formed of a material having a higher modulus of elasticity than the resilient portions of valve member 32, is partially enclosed within body 34. Stiffener 48 is cup-shaped for greater rigidity and comprises a bottom wall 50 formed with a central aperture 52 and a plurality of apertures 54 radially spaced from aperture 52, and cylindrical side wall 56 formed with a plurality of apertures 58 therein. A flange 60 is formed at the other end of side wall 56 and extends outwardly. Aperture 62 is formed in flange 60 and serves as a bleed aperture for transmitting pressure from chamber 17 to chamber 19. The resilient material of body 34 extends through apertures 54 and 58 and in addition to the adhesive forces, tends to firmly secure stiffener 48 to body 34.

Flange 60 underlies flange 36 and is in intimate contact therewith due to the adhesion of the material of body 34 thereto. The diameter of flange 60 is slightly less than the outer diameter of flared skirt 38 and the inner diameter of cap 18. In addition to guide members 44 aiding movement of valve member 32, the outer periphery of flange 60 is guided by cap 18. Furthermore, flange 60 and guide members 44 prevent cocking or lateral instability of valve member 32. Hub 40 and body 34 are formed with a central passage 64 provided with a pilot valve seat portion 66 adapted to be engaged with pilot valve member 26 of armature 24.

In operation, valve member 32 controls a flow of fluid from inlet 12 into chamber 17 and through valve seat 16 into outlet 14. When valve member 32 is in the position shown in FIG. 1, resilient body 34 is in engagement with valve seat 16 and outlet 14 does not communicate with chamber 17. Pilot valve member 26 is in engagement with pilot seat 66 and closes pilot passage 64 to prevent outlet 14 from communicating with chamber 19. The higher pressure existing in inlet 12 is transmitted through chamber 17, bleed passage 46 and bleed aperture 18 to chamber 19. The fluid in outlet 14 is at a lower pressure than the fluid in inlet 12 and because of the greater area of valve member 32 in contact with the fluid in chamber 19, the higher pressure causes valve member 32 to remain seated against valve seat 16 and prevent any flow from inlet 12 to outlet 14. Pressure of the fluid in chamber 17 tends to cause resilient skirt 38 to be pressed against the inner wall of cap 18. However, because the pressure in chamber 19 is equal to the pressure in chamber 17, the frictional force of the skirt 38 against cap 18 is due solely to the stress set up in skirt 38 caused by bending the skirt inwardly from a slightly flared condition to conform to the diameter of cap 18. This friction is sufficient to prevent valve member 32 from "chattering."

As previously indicated, solenoid 30 is of a conventional type and may be mounted so that upon either energization or de-energization of coils 28, the armature 24 will be caused to move out of engagement with valve seat 66 whereupon the fluid will flow from chamber 19 through pilot passage 64 towards outlet 14. This flow of fluid sets up a pressure differential across valve member 32 between the chamber 17 and chamber 19, with the lower pressure existing in chamber 19. The higher pressure in chamber 17 causes valve member 32, guided by guide members 44 contacting the walls of outlet 14 and flange 60 contacting the inner wall of cap 18, to move axially whereupon valve member 32 will be disengaged from valve seat 16. At this point, fluid will flow from inlet 12 into chamber 17, through valve seat 16, and into outlet 14. The higher pressure in chamber 17 causes skirt 38 to be pressed more tightly against the walls of cap 18 and thereby prevents any fluid from leaking from chamber 17 to chamber 19 between skirt 38 and cap 18. The greater frictional force thus created will not interfere with movement of valve member 32 since with higher pressures, the force tending to move valve member 32 is correspondingly greater.

It will be apparent also that because the lateral dimension of bleed passage 46 is greater than that of bleed aperture 62, any pressure variations which might tend to cause the resilient walls of passage 46 to change dimensions, will not affect the fixed diameter of aperture 62. Thus, a fixed orifice or aperture is provided for bleed purposes which will have constant characteristics and is unaffected by pressures existing within the mechanism.

Movement of the armature 24 into engagement with valve member 32 seats pilot valve member 26 against pilot valve seat 66 thus blocking off or closing pilot passage 64. This causes a pressure to build up in chamber 19 which is transmitted through passage 46 and bleed aperture 62 from chamber 17, and thereby creates a force which tends to move valve member 32 into engagement with valve seat 16. Further movement will seat valve member 32 against valve seat 16 thereby blocking and shutting off the flow of fluid from inlet 12 to outlet 14. The valve member will assume the position again as shown in FIG. 1.

It will be apparent that this invention is applicable to many types of valves. As an example, it is readily adaptable to a mixing valve wherein fluids from different sources may be mixed prior to reaching inlet 12; or as an alternative, two or more such valves as described herein may have their outlets 14 connected to a common mixing chamber so that fluids of different characteristics may be each controlled by a valve member 32 and mixed at a point further on in the system, rather than prior to entering the valve.

It is understood that many changes may be made in the combination and arrangement of parts and in the details of construction within the scope of the appended claims without departing from the invention disclosed herein.

I claim:

1. In a control valve including a housing having a walled chamber therein, a valve member in said housing comprising a resilent body portion having a radially extending flange in said walled chamber provided with a first passage therethrough, and a stiffener partially disposed within said resilient body, said stiffener and said resilient body including means defining a pilot passage therethrough, said stiffener having a stiffener flange portion cooperating with said resilient flange and provided with an aperture therein disposed in alignment with said first passage to form a bleed passage through said resilient flange and said stiffener flange, said aperture being of lesser diameter than said first passage whereby the characteristics of said bleed passage are unaffected by changes in size of said first passage caused by pressure variations.

2. The device of claim 1 wherein a resilient outwardly flared skirt is carried by said radially extending flange and engages the walls of the chamber to prevent fluid from leakage therebetween.

3. A control valve comprising a housing having a flow passage therethrough and an annular valve seat positioned in said passage, said housing having a cylindrical wall coaxial with and spaced from said valve set, a resilient valve member in said passage comprising a body portion having a central pilot passage therethrough and a resilient radial flange portion sealingly slidable in said cylindrical wall, a rigid stiffener member partially embedded in said body portion and having a radial supporting portion underlying said radial flange portion, said radial supporting portion having a peripheral portion slidably engaging said cylindrical wall, said radial supporting and flange portions having a common bleed passage therethrough, said valve body portion having an integral axially extending resilient hub portion comprising a cylindrical base portion adapted to telescope with the internal wall of said valve seat, and radially extending guide portions slidably engaging the said internal wall of said valve seat.

References Cited in the file of this patent

UNITED STATES PATENTS

| | | |
|---|---|---|
| 1,266,324 | Schact | May 14, 1918 |
| 2,181,900 | Langdon | Dec. 5, 1939 |
| 2,311,851 | McClure | Feb. 23, 1943 |
| 2,394,911 | Griswold | Feb. 12, 1946 |
| 2,574,488 | Langdon | Nov. 13, 1951 |
| 2,620,826 | Johns | Dec. 9, 1952 |
| 2,815,041 | Rimsha | Dec. 3, 1957 |
| 2,855,949 | Sterner | Oct. 14, 1958 |

FOREIGN PATENTS

| | | |
|---|---|---|
| 642,498 | Germany | Mar. 6, 1937 |